US012591855B1

(12) United States Patent
Ashjian et al.

(10) Patent No.: US 12,591,855 B1
(45) Date of Patent: Mar. 31, 2026

(54) SYSTEM FOR FACILITATING HIRING DECISION MAKING

(71) Applicant: OfferDay AI Inc., San Diego, CA (US)

(72) Inventors: Robert Simon Ashjian, Ventura, CA (US); Amanda Christine Ashjian, Ventura, CA (US); Alex Christopher Handzel, Del Mar, CA (US); Connor Girard Jetton, Koloa, HI (US)

(73) Assignee: OfferDay AI Inc., San Diego, CA (US)

( * ) Notice: Subject to any disclaimer, the term of this patent is extended or adjusted under 35 U.S.C. 154(b) by 0 days.

(21) Appl. No.: 19/281,545

(22) Filed: Jul. 25, 2025

Related U.S. Application Data

(60) Provisional application No. 63/769,770, filed on Mar. 11, 2025.

(51) Int. Cl.
*G06Q 10/00* (2026.01)
*G06Q 10/0631* (2023.01)
(Continued)

(52) U.S. Cl.
CPC ... *G06Q 10/1053* (2013.01); *G06Q 10/06315* (2013.01); *G06Q 10/06393* (2013.01)

(58) Field of Classification Search
CPC ................................................. G06Q 10/06393
See application file for complete search history.

(56) References Cited

U.S. PATENT DOCUMENTS

2019/0102704 A1* 4/2019 Liu ........................ G06N 5/022
2024/0143606 A1* 5/2024 Buhrmann ............ G06F 16/248
(Continued)

FOREIGN PATENT DOCUMENTS

| | | |
|---|---|---|
| CN | 117236647 A | 12/2023 |
| CN | 117350687 A | 1/2024 |
| KR | 102449661 B1 | 10/2022 |

OTHER PUBLICATIONS

V. Manish, Y. Manchala, Y. Vijayalata, S. B. Chopra and K. Y. Reddy, "Optimizing Resume Parsing Processes by Leveraging Large Language Models," 2024 IEEE Region 10 Symposium (TENSYMP), New Delhi, India, 2024, pp. 1-5, doi: 10.1109/ TENSYMP61132.2024.10752300. (Year: 2024).*

(Continued)

*Primary Examiner* — Matheus Ribeiro Stivaletti
(74) *Attorney, Agent, or Firm* — BECKMAN LAW P.C.; Christopher Beckman

(57) ABSTRACT

An employment application review, interpretation, management and tracking system is provided, which greatly reduces the amount of time spent by recruiters by assisting human recruiters in early applicant screening and pre-selection, prior to a human interview. The system is a new multi-component system, including computer hardware and software and an AI subsystem, including both an AI-based resume analysis sub-module and an AI-based interview generation and analysis sub-module, which then create, respectively, a Resume Score; and an Interview Score. Each of those two scores is determined with respect to a given employment position. These two scores are then used to create a new form of score reflecting a candidate's fitness for the given employment position, an "ApplicantIQ score." The system implements one or more specialized resume analysis LLM subsystems, incorporating new techniques for evaluating soft factors relevant to an employment position.

20 Claims, 7 Drawing Sheets

(51) Int. Cl.
   G06Q 10/0639       (2023.01)
   G06Q 10/1053       (2023.01)

(56)                References Cited

U.S. PATENT DOCUMENTS

| | | | | |
|---|---|---|---|---|
| 2025/0117753 A1* | 4/2025 | Veldanda | ........... | G06Q 10/1053 |
| 2025/0131365 A1* | 4/2025 | Dangi | .................... | G06Q 50/01 |
| 2025/0225484 A1* | 7/2025 | Pudasaini | ............. | G06F 40/279 |
| 2025/0245251 A1* | 7/2025 | Schiff | ................ | G06Q 10/1053 |
| 2025/0252256 A1* | 8/2025 | Garg | .................... | G06F 40/174 |
| 2025/0371317 A1* | 12/2025 | Thompson, III | ....... | G06N 3/006 |

OTHER PUBLICATIONS

D'Souza, Max Constance, et.al., "AI-Powered Recruitment: Transforming the Hiring Process," IJEETE Journal of Research, vol. 9, Issue 2, Jul.-Dec. 2002, https://ijoeete.com/wp-content/uploads/2024/09/29-max-d.pdf, 5 pages.

Hirevue.com, https://web.archive.org/web/20250719212318/https://www.hirevue.com/ai-in-hiring, accessed on Sep. 11, 2025, 11 pages.

Hirevue.com, https://web.archive.org/web/20250803004434/https://www.hirevue.com/ai-in-hiring, accessed on Sep. 11, 2025, 16 pages.

Hirevue.com, https://web.archive.org/web/20250803005122/https://www.hirevue.com/about, accessed on Sep. 11, 2025, 13 pages.

Thakur, Abhijeet, et. al., "Use of Artificial Intelligence (AI) in Recruitment and Selection," Proceedings of the Internatioal Conference on Applications of Machine Intelligence and Data Analytics (ICAMIDA 2022), May 19, 2023; https://papers.ssrn.com/sol3/papers.cfm?abstract_id=4452924, 10 pages.

* cited by examiner

Figure 8:
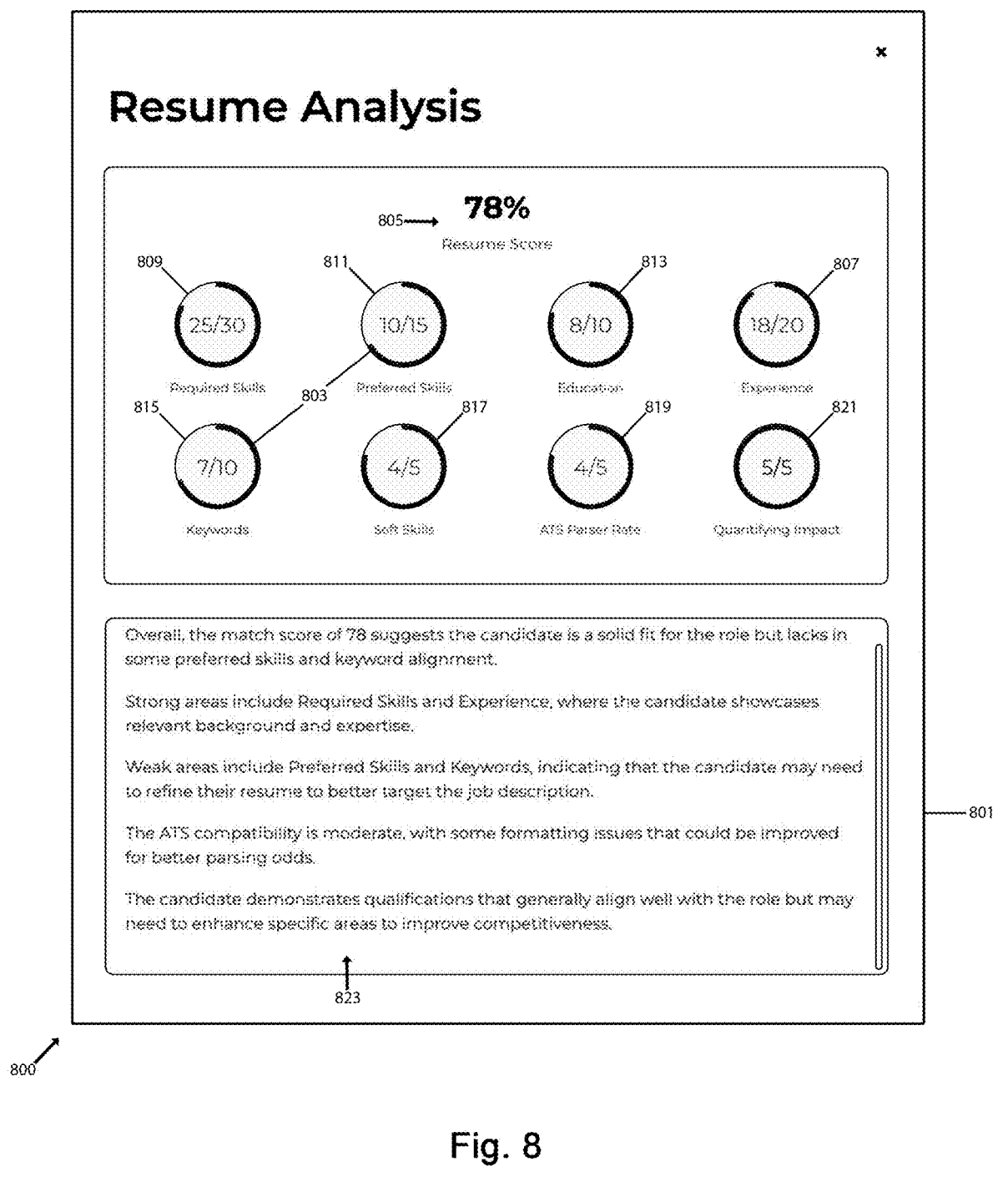

Resume Analysis

805 → 78%
Resume Score

809 — 25/30
Required Skills

811 — 10/15
Preferred Skills

813 — 8/10
Education

807 — 18/20
Experience

803

815 — 7/10
Keywords

817 — 4/5
Soft Skills

819 — 4/5
ATS Parser Rate

821 — 5/5
Quantifying Impact

Overall, the match score of 78 suggests the candidate is a solid fit for the role but lacks in some preferred skills and keyword alignment.

Strong areas include Required Skills and Experience, where the candidate showcases relevant background and expertise.

Weak areas include Preferred Skills and Keywords, indicating that the candidate may need to refine their resume to better target the job description.

The ATS compatibility is moderate, with some formatting issues that could be improved for better parsing odds.

The candidate demonstrates qualifications that generally align well with the role but may need to enhance specific areas to improve competitiveness.

SYSTEM FOR FACILITATING HIRING DECISION MAKING

INTELLECTUAL PROPERTY NOTICE

FIELD OF THE INVENTION

The present disclosures relate to new systems, devices and methods for employment applicant tracking and management.

BACKGROUND

The history of employment predates recorded history, but likely began with very few rules, created by early hunter-gatherer human societies. For example, evidence exists that *Homo sapiens* hunting parties some 200,000 years ago tended to have specialized jobs for different individuals, based on their social rank, skills, age and gender. However, this division of labor was largely informal.

As hunter-gatherer societies evolved and early agrarian civilizations formed, specialized labor greatly increased, and became more formalized. Since the industrial revolution, and after the advent of advanced, specialized corporations, each with a range of positions, specialized employment practices became far more emphasized and important. And it remains so today. With this increased complexity and specialization of employment roles, recruiting has also become more specialized.

In this context, companies have made substantial efforts to make recruiting more effective, and to reduce employment recruiting costs, taking approaches that rely both on in-house and outside recruiting. Larger companies have developed human resources departments dedicated to managing recruiting, training and career development.

Employers use a wide variety of computer systems and software applications to aid in administering their employment programs. To aid in managing business, companies may develop an enterprise resource planning system ("ERP"), mainframe or other main business system including computer hardware and software. And, in many cases, larger businesses will also develop additional systems and subsystems for specialized functions. For example, a company may use separate systems or subsystems for payroll, communications, legal functions, accounting, customer service, logistics, finance, and management (each, a "Business Subsystem"). In addition, companies may use third-party desktop and/or smartphone software applications, if required by partners and vendors in the employment process, such as employment listing platforms and freelancing websites, like INDEED, MONSTER.COM and CAREERBUILDER.

Some such third parties may provide and connect their own applications, for example, through a temporary network connection or an application programming interface ("API"), to those Business Subsystems. There is no general consensus in the employment industry as to which systems and third-party applications are best, and new options emerge regularly.

There remains a long-felt need for improved human resources, recruiting and employment management systems in a wide variety of businesses.

It should be understood that the disclosures in this application related to the background of the invention, in, but not limited to this section titled "Background," do not necessarily set forth prior art or other known aspects exclusively, and may instead include art that was invented concurrently or after the present invention and conception, and details of this application's inventor's own discoveries and work and work results.

SUMMARY OF THE INVENTION

New systems, devices and methods are provided for employment application review, interpretation, management and tracking. In some embodiments, a new type of employment application review, interpretation, management and tracking system (the "Offerday ATS" or the "Offerday System") is provided, which greatly reduces the amount of time spent by recruiters other business human resources by avoiding the need for human-conducted screening interviews.

In some embodiments, such an Offerday System is a new multi-component system, including computer hardware and software and an AI subsystem, including both 1) an AI-based resume analysis sub-module, and 2) an AI-based interview generation and analysis sub-module, which then create, respectively, 3) a Resume Score; and 4) an Interview Score. Each of these two scores is determined with respect to a given employment position, in some embodiments, these two scores are then used to create 5) a new form of score reflecting a candidate's fitness for the given employment position (a.k.a., an "ApplicantIQ score"). An ApplicantIQ score, as an ultimate output of the Offerday System, may represent how likely a candidate is to succeed in the given employment position.

In some embodiments, an Offerday System implements at least one resume analysis large language model ("LLM") subsystem, within the AI-based resume analysis sub-module, which may: A. analyze listing information for the given employment position; and B. aid in determining the Resume Score for a given candidate applicant's submission of written application materials, including, but not limited to, a resume. However, in some embodiments, a separate LLM or other AI component may be provided for each of the above functions. It should also be noted that, in some embodiments, separate LLMs or other AI components of the Offerday system may be used to analyze candidates' resumes (both historic and a current candidate's resume) and other application materials (again, both historic and a current candidate's materials), respectively. In any event, in some embodiments, the resume analysis LLM is trained on data related to a plurality of historic resumes and other written application materials, e.g., submitted in response to other employment positions, related to the given employment position, which have been labelled as being associated with, or not being associated with, a candidate's possession of particular job performance relevant variables ("criteria") and/or criteria types.

In addition to more traditional analysis of employee qualifications/criteria for a listed position, in some embodiments, the resume analysis sub-module determines other "soft" criteria for employee qualifications, or types thereof, such as: i. cultural fit, ii. temperament, iii. outside activities and iv. outside interests. In some such embodiments, the AI-based resume analysis sub-module of the Offerday System analyzes both the listing information for the given employment position, and the resume and/or other a given applicant's written application materials for the given position for the presence of such soft criteria, and whether they are complementary.

For example, in some embodiments, the resume analysis sub-module searches for, and creates a list of, key words, phrases and/or other terms present in the listing information which, historically, have been linked with one or more such criteria or types, such as soft criteria or soft criteria types, such as having worked in "fast-paced start-up environments" being linked with an entrepreneurial, adaptable mindset, or having a cultural fit for a dynamic workplace. In some embodiments, such key words or phrases relate to how a candidate expresses themselves (as semantic or sentiment indicators), as opposed to directly indicating that the candidate possesses the given criteria. The resume analysis sub-module then creates a record, in some embodiments, indicating that the soft criterion, and/or type of soft criteria, is present within the given listed position.

However, in some embodiments, rather than identifying and conducting a search for particular key words, phrases and/or other terms, the resume analysis sub-module of the Offerday System includes an additional, specialized LLM which has been trained on other, historical listing information previously labeled as relating to candidates with such soft criteria or soft criteria types, to determine their presence in the listing information for the given position. And the resume analysis sub-module then creates the record indicating that the soft criterion, and/or type of soft criteria, is present within the given listed position.

In some such embodiments, the resume analysis sub-module also ranks all such identified criteria and/or criteria types (e.g., soft criteria) relative to one another, and/or, in some such embodiments, all identified types of soft factors relative to one another, based on the prominence of language indicating the presence of such soft factors (which again may be determined by an LLM).

Then, in some embodiments, the resume analysis sub-module of the Offerday System generates a second list of key words, phrases and/or other terms including all which are known and/or related to each such criterion or criterion type (e.g., each soft criterion). And, in some such embodiments, the resume analysis sub-module of the Offerday System ranks such key words, phrases and/or other terms based on the ranking of the criterion and/or type of criterion, discussed above. And, based on an analysis of the resume or other application materials, the resume analysis sub-module of the Offerday System may then determine the Resume Score, for example, based on the number and prominence of the key words, phrases, terms and/or related phrases, present within the resume and/or other application materials, and the extent to which they match the ranking of the second list of key words and phrases. However, in some embodiments, the resume analysis sub-module of the Offerday System produces such a Resume Score with the aid of an LLM comparing language from the resume and/or other written application materials submitted by a given applicant to the language of the listing, and/or, in some embodiments, the second list of key words, phrases and/or other terms. In embodiments where the resume analysis sub-module produces such a Resume Score with the aid of such an LLM based on both a. language in the written application materials and b. the second list of key words, phrases and/or other terms, a separate language match score for each may be created by the sub-module, and a relative weighting for each such score may be created by the sub-module.

And, in some embodiments, another, interview generation and analysis AI subsystem is included in the Offerday System. In some embodiments, the interview generation and analysis AI subsystem includes an algorithm incorporating job criteria and criteria types identified within the listing information for the given employment position. And, in some such embodiments, the algorithm may be determined by a listing analysis LLM, which may determine the identity and weighting of such performance relevant variables.

In some embodiments, the interview generation and analysis AI subsystem may include an interview analysis LLM, trained on interview-related data, such as transcripts of a plurality of historic interviews (e.g., for other employment positions, related to the given employment position).

And, in some embodiments, the transcripts are analyzed similarly to written materials submitted by a given applicant, as discussed above, to assess, for example, soft factors, such as cultural fit. However, unlike such written materials, the interview generation and analysis AI subsystem may actively seek information from the candidate related to criteria or lists of key words, phrases and/or other terms. In some embodiments, employer users of the Offerday system may actively guide the interview generation and analysis AI subsystem to pursue particular criteria, including soft criteria, with a unique user interface seeking such input.

In some embodiments, the Offerday system includes a handheld device (such as a smartphone with a mobile application, in accordance with aspects of the inventions set forth herein) comprising or comprised in the control system of the Offerday system. And the smartphone and/or Offerday system may communicate with other systems, such as an external, off-premises aspect of the Offerday system and/or an enterprise resource planning system ("ERP"), in various embodiments. Thus, in some embodiments the Offerday system may communicate with, coordinate and control external systems, having additional control systems and components, as set forth in the present application, in some such embodiments, to manage facilities management being controlled by such external systems. However, aspects of the invention are not limited to the employment and human resources contexts.

In some embodiments, the inventions set forth in this Application are implemented as a comprehensive, all-inclusive control system, managing an entire recruitment process, including the full review of candidate resumes, and generating an Resume Score, conducting interviews via an AI agent implemented by the Offerday system, and generating an Interview Score based on such interviews, generating an ApplicantIQ score, filtering and recommending and selecting candidates, and making offers of employment to selected candidates. However, conversely, in some embodiments, an Offerday system is integrated with an ATS or other system (e.g., via an API) and provides some, but not all, of the aspects for an Offerday system set forth in this application, such as the resume scoring, interviewing, and other scoring and candidate selection aspects set forth herein. In some embodiments, an AI agent implements such interviewing by generating questions and statements via dynamic script generation and a text-to-speech subsystem, and by analyzing candidate's responses by a speech-to-text subsystem and text analysis subsystem.

Canons of Construction

Where any term having multiple possible meanings, based on a reasonable interpretation, is set forth in a sentence, clause or other statement (a "statement") in this application, this application should be read as if each such reasonably possible meaning, significance and/or sense of each and every such term and statement is separately, conjunctively and alternatively set forth in additional alternative statement(s) thereafter.

It should also be understood that, for convenience and readability, this application may set forth particular pronouns and other linguistic qualifiers of various specific gender and number, but, where this occurs, this application should be read as if each other gender and number is separately, conjunctively and alternatively set forth in additional alternative statement(s) thereafter.

The embodiments set forth in detail in this application are to ease the reader's understanding of inventions set forth herein and, as such, are only examples of the virtually innumerable alternative embodiments falling within the scope of the application. No specific embodiment set forth in this application should be read as limiting the scope of any claimed inventions; the inventions of the present application are not limited to any particular preferred embodiment disclosed.

These and other aspects of the invention will be made clearer below, in other parts of this application. This Summary, the Abstract, and other parts of the application, are for ease of understanding only, and no part of this application should be read to limit the scope of the invention, whether or not it references matter also set forth in any other part. Further aspects of the invention will be set forth in greater detail, below, with reference to the particular figures.

BRIEF DESCRIPTION OF THE DRAWINGS

The features and advantages of example embodiments of the invention presented herein will become more apparent from the detailed description set forth below when taken in conjunction with the following drawings.

FIG. 8 depicts another example graphical user interface ("GUI") which may be included in an Offerday system to carry out aspects of the present inventions, in accordance with some embodiments.

DETAILED DESCRIPTION OF THE INVENTION

Figure 1:
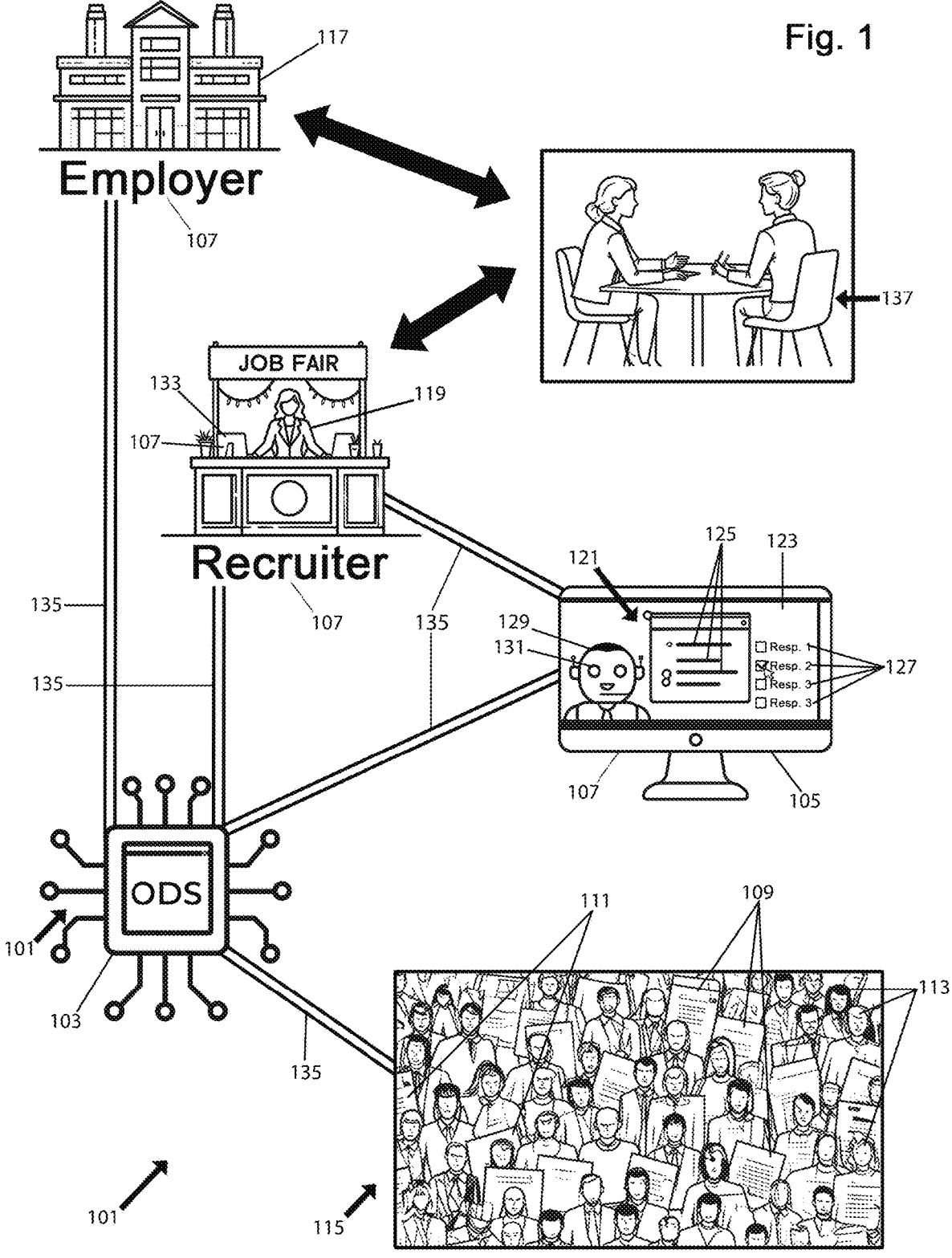
FIG. 1 depicts an example implementation environment for an employment application review, interpretation, management and tracking system (hereinafter, an "Offerday ATS" or the "Offerday System"), including, but not limited to, a control system including computer hardware and software, such as the example control system set forth in reference to FIG. 4, below, carrying out example communications control techniques, in accordance with some embodiments of the present application.

The features and advantages of example embodiments of the invention presented herein are directed to new systems, devices and methods for employment application review, interpretation, management and tracking—and, in particular, for the filtering and analysis of candidates relative to a wide variety of employment positions presented by virtually unlimited numbers and types of employers. These and other aspects will become more apparent from the detailed description set forth below when taken in conjunction with the drawings. This description is not intended to limit the application to the embodiments presented herein, which are only examples of the virtually unlimited possible embodiments falling within the scope of the present application. In fact, after reading the following description, it will be apparent to one skilled in the relevant art(s) how to implement the following example embodiments in alternative embodiments, including any possible order, number or other arrangement of components and subcomponents, and in widely varying contexts (the following orders, components, subcomponents, relationships and contexts being non-limiting).

Embodiments of management systems including, but not limited to, a control system including computer hardware and software, carrying out example communications control techniques, and methods for their use in accordance with some aspects set forth in this Specification are depicted in FIGS. 1 through 8. The following is a list of defined components and/or aspects and reference numbers therefor, as used throughout the figures:

| Reference No. | Component |
| --- | --- |
| 100 | implementation environment |
| 101 | Offerday system |
| 103 | control system |
| 105 | local computer |
| 107 | user(s) and/or user devices |
| 109 | candidates' resumes |
| 111 | other documents |
| 113 | employment candidates |
| 115 | candidate pool |
| 117 | employer user |
| 119 | HR agent and/or recruiter user |
| 121 | AI-generated interview |
| 123 | touchscreen |
| 125 | interview questions, statements and/or other prompts |

-continued

| Reference No. | Component |
|---|---|
| 127 | selectable response indicators |
| 129 | AI agent |
| 131 | avatar |
| 133 | recruiter's desktop computer |
| 135 | communications connections |
| 137 | live, in-person interview |
| 200 | Offerday system |
| 201 | control system |
| 203 | operating system |
| 205 | AI modules |
| 207 | external resources |
| 209 | communications connections |
| 211 | external communications connections |
| 213 | internal communications connections |
| 215 | resume analysis sub-module |
| 217 | interview generation and analysis sub-module |
| 219 | resume analysis LLM |
| 221 | interview generation and analysis LLM |
| 223 | resume score output |
| 225 | interview score output |
| 227 | ApplicantIQ score generator |
| 229 | virtual machine |
| 231 | virtual machine operating system |
| 233 | ApplicantIQ LLM |
| 235 | ApplicantIQ score output |
| 300 et seq. | example method steps |
| 400 | control system |
| 401 | input/output device |
| 403 | memory device |
| 405 | long-term data storage device |
| 407 | processor(s) |
| 409 | Internet server(s) |
| 411 | local machine(s) |
| 413 | cameras and microphones |
| 414 | sensor(s) |
| 415 | ubiquitous computing devices |
| 417 | application programming interface |
| 418 | scanner |
| 419 | tablet, computer and/or smartphone with application software |
| 500 | administrative user GUI |
| 501 | display |
| 503 | local computer device |
| 505 | control system |
| 507 | wireless antenna |
| 600 et seq | example Job Detail GUI |
| 700 et seq | example Applicant Detail GUI |
| 800 et seq. | example Resume Analysis GUI |

FIG. 1 depicts an example implementation environment 100 for an employment application review, interpretation, management and tracking system (hereinafter, an "Offerday ATS" or the "Offerday system") 101, which may include, but is not limited to, a control system 103 including specialized computer hardware and software, such as the example control systems set forth in reference to FIGS. 2 and 4, below, carrying out example communications control techniques, in accordance with some embodiments of the present application. Offerday system 101 is illustrated carrying out example techniques aiding in the interpretation, management and tracking of employment positions, applications and candidacy, initiating and conducting interviews, making hiring decisions, and/or other related processes of Offerday systems, in accordance with aspects of the invention set forth in the present application.

As mentioned above, in some embodiments, the inventions set forth in this Application are implemented as a comprehensive, all-inclusive control system, managing an entire employment application cycle, and as part of a human resources administrative system. Conversely, in some embodiments, the Offerday system includes a variety of separate, yet intermittently communicatively connected devices, such as one or more local computers, peripheral devices and/or smart devices, such as example local computer 105, which will be discussed in greater detail below, in accordance with some aspects of the inventions set forth herein. And, in some embodiments, separate user(s) and/or user device(s) 107 of the Offerday system may communicate with other systems, such as an external, off-premises Offerday system and/or an enterprise resource planning system ("ERP"), in various embodiments. Thus, in some such embodiments the Offerday system may communicate with, coordinate and control external systems, each having additional control systems and components, as set forth in the present application, in some such embodiments, to manage aspects of the employment application cycle being controlled by such external systems.

In any event, as discussed elsewhere in this application, in some embodiments, a control system such as control system 103, comprising or comprised in an Offerday system 100, includes specialized computer hardware and software, configured to aid in managing employment listings, candidacy, applications, interviews, and hiring decisions within an employment environment (or pre-employment environment, such as a recruiting environment), as shown in example implementation environment 101. For example, in some embodiments, such an Offerday system creates a listing (or imports a listing from an external source, such as an external, auxiliary Applicant Tracking System ("ATS") which may provide such listing through an API, for example) for an employment position, and begins to intake and record a plurality of candidates' resumes (such as the examples shown as candidates' resumes 109), other documents (such as the examples shown as other documents 111), and/or related data submitted in response to an open employment position by a plurality of candidates (such as example employment candidates 113) for such an employment position. Such a plurality of candidates, resumes, other documents and/or related data submitted in response to an open employment position may be referred to as a candidate pool 115, in some embodiments. For example, in some embodiments, the control system may aid in creating such a listing for an employment position according to a user's specifications (such as an administrative user). For example, in some embodiments, an employer user, such as example employer user 117, or an agent of an employer user, such as example HR agent and/or recruiter user 119, or another administrative user of the control system, may dictate a series of qualitative and/or quantitative criteria required and/or desired for appropriate candidates for the listed employment position.

As discussed in greater detail below, in some embodiments, the employment candidates 113 may first view and then each submit one or more resumes detailing their qualifications, other documents and/or related data, in response to the listing for the employment position—such as example candidates' resumes 109 and other documents 111. As discussed in greater detail elsewhere in this application, in some embodiments, the control system 103 may include and/or support artificial intelligence ("AI") components and sub-components thereof, such as AI software and hardware modules to aid in managing one or more (and, in some such embodiments, hundreds or even thousands) of candidates for an employment position, and an unlimited number of supporting documents and data related to the candidates' candidacy for such an employment position. For example, in various embodiments, such an AI module or sub-module may aid in the review of candidates' resumes by comparing qualifications with criteria stated in the employment position listing (which AI module or sub-module may be referred to as a "resume analysis module" or "resume analysis sub-module," respectively). And, the control system may aid by selecting such candidates, determining the degree to which their candidacy aligns with the listed position, in some embodiments, based on deep learning, involving training based on prior candidates' stated qualifications in resumes and other documentation in response to the listing, or other, similar listings, and such prior candidates' performance in the same, or similar, employment positions, in various embodiments.

In addition, in some embodiments, the control system 103 aids in conducting interviews of the selected candidates, for example, using an interview generation sub-module (such as example interview generation and analysis sub-module 217, discussed below) to create and conduct AI-generated interviews, such as the example AI-generated interview 121 being shown. In some such embodiments, such AI-generated interviews may be administered, at least in part, on a separate, local computer system, such as example local computer 105, which may include a touchscreen 123 and/or other suitable types of input and output device(s) for creating and presenting interview questions, such as example visually presented written interview questions, statements and/or other prompts 125, in some embodiments, as discussed in greater detail below, and elsewhere in this application. In some embodiments, such interview questions, statements and/or other prompts 125 may be administered dynamically, including a series of interview questions that are planned and/or modified dynamically, based on the candidates' real-time responses, which may be made, for example, and recorded by selecting (e.g., by clicking on them via selection arrow 126) selectable response indicators 127 in some embodiments, to such interview questions. For example, in some embodiments, the interview generation sub-module records oral responses from an employment candidate subject to the interview, and includes a speech-to-text transcription sub-component, which it then processes with an artificial intelligence aspect, such as a neural network and/or algorithm. In some embodiments, such interview questions 125 may be administered by an AI agent, such as example AI agent 129, depicted on touchscreen 123. In some such embodiments, AI agent 129 may include an avatar 131, or other depiction of a human or humanoid figure, in some such embodiments, and may generate speech (e.g., using a text-to-speech generator). And, in some embodiments, the interview generation sub-module may generate data and analytical scores related to those activities, and filtering, recommending, selecting candidates, and/or making offers of employment to selected candidates (e.g., based on such data and/or analytical scores), in any possible combination of those actions and techniques, in various embodiments. In some embodiments, one or more of such artificial intelligence components may include a specialized artificial intelligence sub-component, which may generate and periodically update one or more algorithms based on training data and/or experience gained in operating, and generate output such data and analytical scores. In some such embodiments, one or more of such artificial intelligence components may include a large language model ("LLM") to so generate and/or update such algorithm(s).

Based on such data output and analytical scores, from such an interview generation sub-module, and/or, in some embodiments, an additional, interview analysis sub-module, the control system may proceed to create additional analytical score(s), in some embodiments. For example, in some embodiments, the control system creates a new form of score reflecting a candidate's fitness for the given employment position (a.k.a., an "ApplicantIQ score"), based on data output and analytical scores from a plurality of such modules. For example, in some embodiments, the control system creates an ApplicantIQ score based, at least in part, on such output and analytical scores generated from both: a. such an interview analysis sub-module; and b. a resume analysis sub-module, as also discussed above.

In some embodiments, administrative users, such as employer user 117 and recruiter user 119, may connect with the control system 103 (e.g., using their own intermittently connected local computer systems and/or devices, such as example recruiter's desktop computer 133) and use special, dedicated graphical user interfaces presented thereon by the control system 103, to review the candidacy of various employment candidates for the employment position subject to a listing. In some such embodiments, such intermittently connected local computer systems and/or devices and other local computers may be connected with, and form a part of, the control system, for example, via example wired or wireless communications connections 135. And, in some embodiments, such users may select some of such candidates, e.g., having a ApplicantIQ score or other related analytical output from the control system above a particular predetermined threshold for further review. And, in some such embodiments, such further review may include a live, in-person interview 137 for each such selected candidate, which may be conducted by the employer user 117 and/or recruiter user 119, a human and/or control system measured performance during which may be sensed and also recorded on the control system. In some embodiments, the control system may even make a biding offer of employment to an employment candidate, based on the candidate's ApplicantIQ score exceeding a particular predetermined threshold for employment offers to be made. And, in some embodiments, the control system may make a biding offer of employment to an employment candidate, based on the candidate's ApplicantIQ score and/or the measured performance at the in-person interview exceeding a particular predetermined threshold for employment offers to be made.

Figure 2:
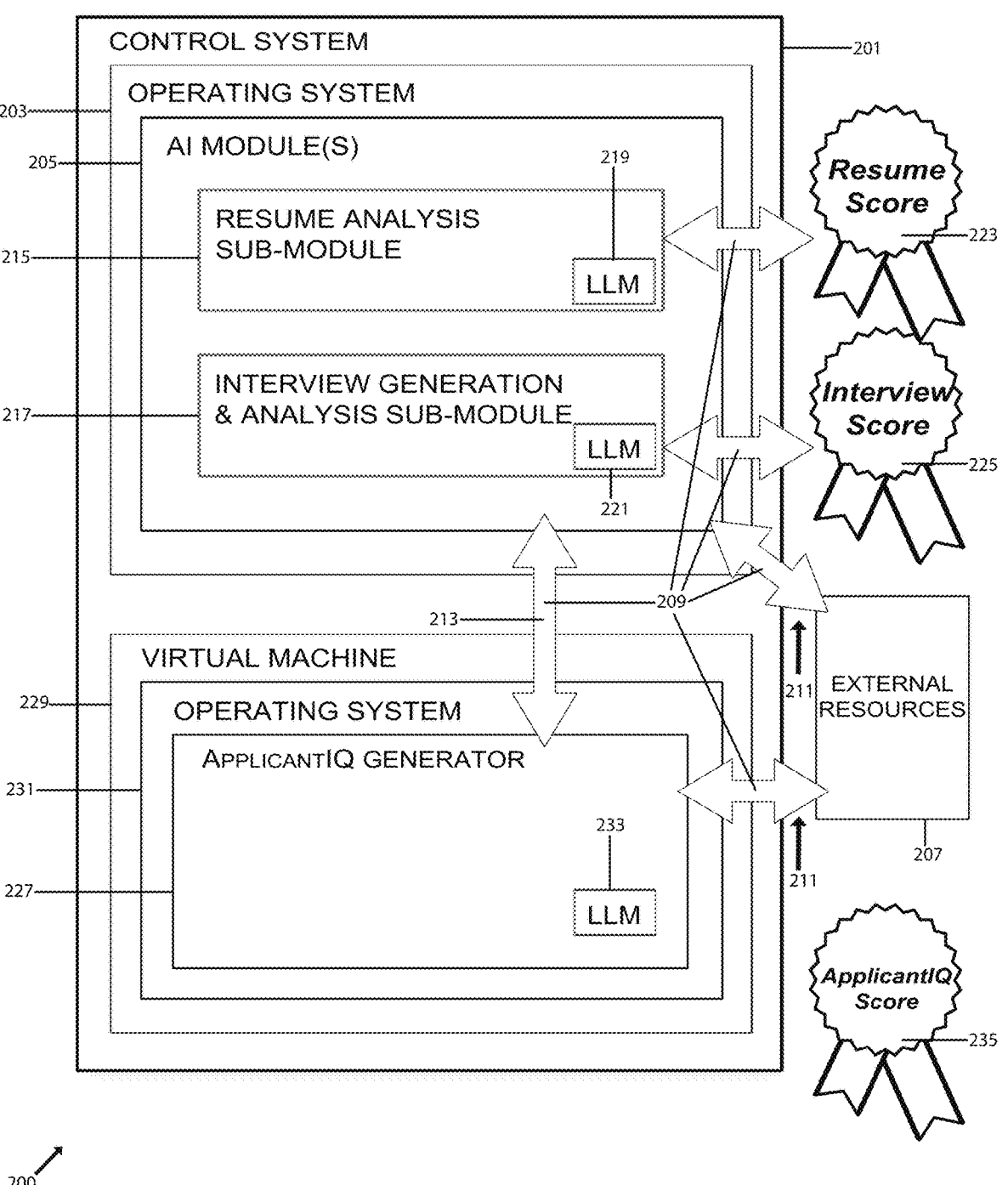
FIG. 2 is a diagram of example major system components and modules of an example Offerday system, which may comprise, or be comprised within, a control system and/or computer hardware, such as the control system set forth in reference to FIG. 4, below, in accordance with aspects of the present invention.

FIG. 2 depicts a diagram of example major system components and modules of an example Offerday system 200, which may comprise, or be comprised within, a control system and/or computer hardware, such as the control system set forth in reference to FIG. 4, below, in accordance with aspects of the present invention.

Among other things, example Offerday system 200 may comprise (or be comprised within), but is not limited to, any number of computer hardware devices programmed with example software, or otherwise configured, to carry out aspects of the present invention set forth in the present application—including, but not limited to the example control systems, networks and computer hardware and software set forth in this application. A number of example implementations of the present inventions may be carried out within the framework of Offerday system 200, as will be discussed in greater detail, below.

Offerday system 200 comprises an example implementation of techniques for aiding in the interpretation, management and tracking of employment positions, applications and candidacy, and/or other related processes of an Offerday system, in accordance with aspects of the invention set forth in the present application. In some embodiments of such an implementation, Offerday system 200 may comprise a control system 201, which itself may comprise, or be comprised within, computer hardware (such as the computer hardware system 400, discussed below, or another such client device). As also discussed elsewhere in this application, such computer hardware may comprise a number of input and output devices, and a GUI, created by computer software, configuring the computer hardware for a user to carry out any aspect of the present inventions set forth in the present application, such as managing a wide variety of communications through the computer hardware system and/or control system, or any of the other steps set forth in the present application (for example, in FIG. 4, below). Control system 201 may comprise an operating system 203, which manages control system 201 resources, and acts as an intermediary between the control system 201 and software and hardware modules, such as example artificial intelligence ("AI") modules 205, examples of which are discussed in further detail below. Such software and hardware modules thus may run on the control system 201, and may be managed by the operating system 203, and may, among other aspects discussed in this application, aid in managing employment listings, candidacy, applications, interviews, and hiring decisions, as discussed in detail throughout this application. In so doing, control system 201, operating system 203, and AI Modules 205 may also connect with external resources 207, in some embodiments (e.g., via example communications connections 209, such as example external communications connections 211) which external resources may include a wide variety of external databases and additional control systems, which may themselves be similar in nature to the example control system set forth below, in reference to FIG. 4. In addition to external communications connections, such as the examples provided as external communications connections 211, communications connections 209 may also include internal communications connections, such as the examples provided as internal communications connection 213, in some embodiments. Internal communications connections may, among other things, allow AI modules 205 to provide output to other aspects of Offerday system 200, such as additional computer software and/or hardware modules related to generating employment recommendations and an ApplicantIQ score, as will be discussed in greater detail below.

In some embodiments, the control system 201 and operating system 203 may include and/or support artificial intelligence components, such as AI modules 205, which relate to managing one or more (and, in some such embodiments, hundreds or even thousands) of candidates for an employment position, and an unlimited number of supporting documents and data related to the candidates' candidacy for such an employment position. For example, in various embodiments, AI modules may relate to aiding in the recruitment process, including the review of candidates' resumes, which may be carried out by example resume analysis sub-module 215 in some embodiments, conducting interviews via an AI agent, which may be conducted by example interview generation and analysis sub-module 217 in some embodiments, and generating data and analytical scores related to those activities, and filtering, recommending and selecting candidates, and/or making offers of employment to selected candidates, in any possible combination of those actions and techniques, in various embodiments. In some embodiments, one or more of such artificial intelligence components may include a specialized artificial intelligence sub-component, which may generate and periodically update one or more algorithms based on training data and/or experience operating, and generate output such data and analytical scores. In some such embodiments, one or more of such artificial intelligence components may include one or more large language models ("LLMs") to so generate and/or update such algorithm(s).

For example, in some embodiments, resume analysis sub-module 215 and interview generation and analysis sub-module 217 each may include at least one LLM, such as example resume analysis LLM 219 and interview generation and analysis LLM 221, respectively. In some embodiments, resume analysis LLM 219 may generate output related to its comparison of a candidate's resume, and aspects thereof, with a model resume created by a neural network based on training data (e.g., historical resumes labelled as good matches for a position similar to the listed position for which the candidate supplied her or his resume). And, in some such embodiments, such output may include a Resume Score and/or data related to such a Resume Score (shown, for example, as example Resume Score output 223), which Resume Score may be, or include, a numeric indicator of the relative appropriateness of a candidate, as indicated by the candidate's resume, in comparison to other candidates resumes, as determined with respect to a given employment position for which an employment candidate is applying. In some embodiments, such a resume analysis LLM: A. analyzes listing information for the given employment position; and B. aids in determining the Resume Score for a given applicant's submission of written application materials, including, but not limited to, the candidate's resume. However, in some embodiments, a separate LLM or other AI component may be provided for each of the above functions, as discussed further below. In some embodiments, the resume analysis LLM is trained on data related to a plurality of historic resumes and other written application materials, e.g., submitted in response to other employment positions, related to the given employment position, which have been labelled as having, or not having, particular job performance criteria. And, in some embodiments, to analyze listing information for the given employment position, the resume analysis LLM is trained on data related to a plurality of historic employment position listings, which were previously labelled as relating to the same, or a similar employment position, and, based on that training, includes a neural network that produces a model language for each such criteria. However, in some embodiments, a separate, listing analysis LLM may be included, in addition to the resume analysis LLM, to so determine the identity and weighting of such job performance criteria.

In addition to an analysis of employee qualifications for a listed position, in some embodiments, the resume analysis sub-module 215 and/or resume analysis LLM 219 determine(s) other "soft" criteria for employment qualifications, or types thereof, such as: i. cultural fit, ii. behavior, iii. temperament, iv. other personality traits, v. proclivities, vi. habits and routines, vii. outside activities and viii. outside interests of the candidate. In some such embodiments, the AI-based resume analysis sub-module of the Offerday System analyzes both: 1) the listing information for the given employment position, and 2) the resume and/or other written application materials submitted by the candidate for the given position, for the presence of such soft criteria, and whether the listing information and the written application materials and the listing are complementary, meaning the degree to which the listing information and the written application materials emphasize the same soft criteria, and to a similar degree.

For example, in some embodiments, the resume analysis sub-module 215 searches for, and creates a list of, key words, terms and other phrases present in the listing information which, historically, have been linked with one or more soft criteria or soft criteria types, such as having worked in "fast-paced start-up environments" being linked with an entrepreneurial, adaptable mindset, or having a cultural fit for a dynamic workplace. In some embodiments, such key words, phrases and/or other terms relate to and/or are statistically, incidentally or otherwise associated with how a candidate expresses themselves (as semantic or sentiment indicators), but do not directly indicate that the candidate possesses the given soft criteria. And, in some embodiments, the amount of language (e.g., count of key words), and its location and prominence (e.g., primacy or emphasis within a document) in the listing information creates a higher weighting for such soft criteria, within an algorithm applied by the resume analysis sub-module 215. The resume analysis sub-module 215 may then create a record indicating that each such soft criterion, and/or type of soft criteria, is present within the given listed position, and assign a numerical weighting corresponding with that weighting (e.g., a percentage weighting out of 100 for such soft criteria), and rank each such soft criteria, based on their relative weightings, for such a listed position. Then, based on an analysis of the resume or other application materials, the resume analysis sub-module of the Offerday System may determine a Resume Score, for example, based on an algorithm that, when applied to a resume, determines the number, location and prominence of the key words, terms and phrases, or related phrases, present within the resume and/or other application materials, as well as determining the extent to which they match the ranking of the list of key words, terms and phrases.

In some embodiments, the resume analysis sub-module 215 generates a second list of key words, terms and phrases including all of the key words, terms and phrases identified in historical listing information (as discussed above), as well as others which are known and/or related to each such soft criterion. And, in some such embodiments, the resume analysis sub-module 215 ranks all such key words and phrases based on the ranking of the soft criterion and/or a type of soft criterion associated with the listing information, discussed above. And, based on an analysis of the resume or other application materials, the resume analysis sub-module of the Offerday System may then determine a Resume Score, for example, based on the number, location and prominence of each of the key words, terms and phrases, or related phrases, present within the resume and/or other application materials, and the extent to which they match the ranking of the second list of key words, terms and phrases.

In some embodiments, the resume analysis sub-module 215 produces such a Resume Score with the aid of an algorithm (e.g., confidence match) comparing language from the resume and/or other written application materials submitted by a given applicant to the language of the listing, and/or, in some such embodiments, the second list of key words and phrases.

In some embodiments, the resume analysis sub-module 215 produces such a Resume Score with the aid of such an LLM. For example, rather than identifying and conducting a search for particular key words, the resume analysis sub-module 215 may include a specialized LLM which has been trained on other, historical listing information and/or written application materials previously labeled as relating to candidates with such soft criteria or soft criteria types, to determine their presence in the listing information for the given position. And the resume analysis sub-module 215 then creates a record indicating that the soft criterion, and/or type of soft criteria, is present within the given listed position, and to what degree, by numerical weighting based on an algorithm created by the LLM. In some such embodiments, the resume analysis sub-module 215 also ranks all such identified soft criteria relative to one another, and/or, in some such embodiments, all identified types of soft factors relative to one another, based on the prominence of language indicating the presence of such soft factors (which again may be determined by an LLM).

In some embodiments, the resume analysis sub-module 215 and/or resume analysis LLM 219 adjust an algorithm for such key words and weightings based on both 1. language associated with such soft criteria, and 2. language opposing and/or counter-indicating soft criteria, in other listings, positions and application materials of applicants.

As mentioned above, in some embodiments, another, interview generation and analysis AI subsystem is included in the Offerday System, such as interview generation and analysis sub-module 217, which may itself include one or more LLM(s), such as interview generation and analysis LLM 221, in some embodiments. And, in some embodiments, interview generation and analysis LLM 221 may generate output, receive live input from a candidate, and conduct one or more prompts or dialogues with the candidate to conduct an employment-related interview. Further, in some embodiments, the interview generation and analysis LLM 221 may generate output related to a comparison of a candidate's responses during an interview, and aspects thereof, with a neural network created from past responses of other candidates for the position, or a similar position, as training data. And, in some such embodiments, such output may include an Interview Score and/or data related to such an Interview Score (shown, for example, as Interview Score output 225), which Interview Score may be, or include, a numeric indicator of the relative appropriateness of a candidate, as indicated by the candidate's interview responses, in comparison to other candidates responses to other interviews, and their subsequent performance in the same, or similar position(s), as determined with respect to a given employment position for which an employment candidate is applying. In some embodiments, interview generation and analysis LLM 221 may be trained on interview-related data, such as transcripts of a plurality of historic interviews (e.g., for other employment positions, related to the given employment position). And, in some embodiments, the interview generation and analysis AI sub-module 217 includes an algorithm incorporating job performance relevant variables ("criteria") identified within the listing information for the given employment position. And, in some such embodiments, the algorithm may be determined by a listing analysis LLM, which may determine the identity and weighting of such performance relevant variables.

And, in some embodiments, the transcripts are analyzed similarly to written materials submitted by a given applicant, as discussed above, to assess, for example, soft factors, such as cultural fit. However, unlike such written materials, the interview generation and analysis AI sub-module 217 may actively seek information from the candidate related to criteria or lists of key words and phrases. In some embodiments, an AI agent implements such interviewing by generating questions and statements via dynamic script generation and a text-to-speech subsystem, and by analyzing candidate's responses by a speech-to-text subsystem and text analysis subsystem.

In some embodiments, employer users of the Offerday system may actively guide the interview generation and analysis AI subsystem to pursue particular criteria, including soft criteria, with a unique user interface seeking such input.

In some embodiments, ultimately, the Offerday system may create one or more outputs related to a candidate's overall suitability for the given position, which may, in some such embodiments, be based on, or at least partially based on, the Resume Score output 223 and/or the Interview Score output 225. For example, in some embodiments, the Offerday system creates a new form of score reflecting a candidate's fitness for the given employment position (a.k.a., an "ApplicantIQ score"). The ApplicantIQ score, as the ultimate output of the Offerday System, may represent how likely candidates are to succeed in the given employment position. In some embodiments, the ApplicantIQ score may be created by a ApplicantIQ score generator 227 within a segregated hardware subsystem (e.g., virtual machine 229 and virtual operating system 231) with separate addressing and/or otherwise confined and protected resources, in which particular neural networks may be developed and trained on data repositories to generate algorithms for the management of communications, as discussed in greater detail elsewhere in this application. In some embodiments, virtual machine 227 and virtual operating system 229, or instances thereof, may run on a separate system space, with separate file and resource addressing, or otherwise may be segregated from operating system 203, managing separate applications and/or instances of applications. And, as with other artificial intelligence modules provided in the present application, ApplicantIQ score generator 227 may include one or more LLMs, such as example ApplicantIQ LLM 233, trained on historic or other data, such as prior Resume Scores and Interview Scores of other candidates, for the same, or similar positions, and the performance of those candidates in such positions, for example. In any event, ultimately, the ApplicantIQ score generator 227 may generate output including and/or related to the ApplicantIQ score, as shown by example ApplicantIQ score output 235.

Figure 3:
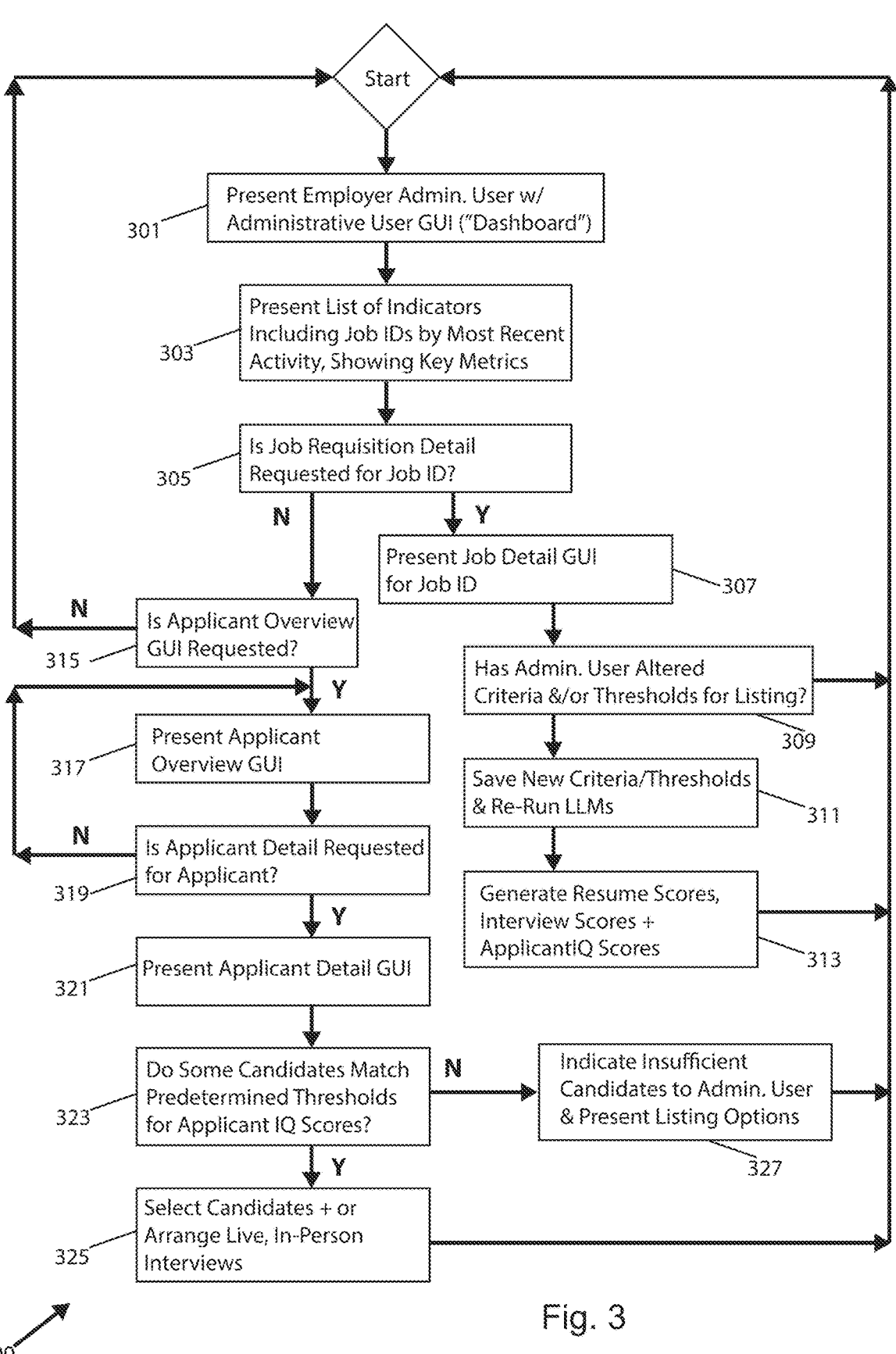
FIG. 3 is a process flow diagram, illustrating several example steps that may be carried out by a control system, such as the example control system set forth in reference to FIG. 4, below, comprised in an FM system, such as any of the FM system embodiments discussed in this application, in accordance with some additional embodiments.

FIG. 3 is an example process flow diagram, illustrating some example steps 300 that may be undertaken by a control system, such as the example control system provided in reference to FIG. 4, below, including and/or included within an Offerday system, in accordance with some example embodiments of the present invention.

Beginning with step 301, in some embodiments, the control system may begin by creating and presenting a graphical user interface ("GUI") for use by an administrative user (an "administrative user GUI,") such as any of the graphical user interfaces discussed below, in FIG. 5 et seq. As discussed elsewhere in this application, such an administrative user may be an employer user, or a user serving as an agent for such an employer user (e.g., a recruiter user) in some embodiments. In some embodiments, before presenting such a graphical user interface for use by an administrative user, the control system may first prompt the administrative user with a secure user login and authentication challenge, and/or another form of authentication (e.g., 2-factor authentication). In any event, after the administrator has been so presented with such an administrative user GUI, the control system next may proceed to step 303, in which it presents a list of indicators of open employment position listings being managed by the control system and that particular administrative user. In some such embodiments, such a list of indicators includes a dedicated aspect, such as a GUI sub-tool (e.g., a row of the GUI), depicting an overview of key metrics for each such open employment position. And, in some embodiments, such a dedicated aspect may include a unique identifier of each such open employment position (which also may be referred to as a "Job ID," in this application). In subsequent step 305, in some embodiments, such a dedicated aspect and/or Job ID may include a hyperlink, or other selectable aspect which, when selected, leads to the generation and presentation of an additional GUI, presenting additional details of the respective listing of the open employment position (a "Job Detail GUI"), in step 307. And, once such a Job Detail GUI has been generated and presented for that listing, in subsequent step 309, the control system may next accept input from the administrative user, using additional GUI aspects of the Job Detail GUI. For example, in some embodiments, the administrative user may select candidates for in-person interviewing, based on indicators within the Job Detail GUI indicating candidates which exceed thresholds for particular analytical fitness indicators with respect to the listing, as discussed elsewhere in this application. As another example, and as pictured, in some embodiments, the Job Detail GUI may present aspects allowing the administrative user to add or alter criteria for the open employment position subject to the listing, and for such thresholds. And, if the administrative user has so adjusted such criteria and thresholds, in some embodiments, the control system may next proceed to step 311, in which it records the new criteria and such thresholds and/or other settings relevant to the listed open employment position, and may re-run AI software programs based on those alterations, such as any of the LLMs discussed in the present application. If the administrative user has not altered any such criteria or other settings, however, the control system may return to the starting position (e.g., after a threshold amount of time has expired, or after the administrative user selects to exit the Job Detail GUI, in some embodiments). The control system may then proceed to re-run LLMs and/or other AI programs based on the selected criteria, in step 313, as discussed elsewhere in this application.

In some embodiments, the control system may also present other, specialized GUIs related to additional functions, some of which are discussed below. For example, in some embodiments, if, in step 315, the administrative user selects a GUI sub-tool which, when activated, requests that the control system generate an "Applicant Overview GUI," the control system does so in subsequent step 317 by proceeding to present a list of candidate indicators, meaning a list of high-level information regarding available candidates being managed by the control system and that particular administrative user—for example, those who have applied to the listed open employment position, or a group of listed open employment positions being managed by the administrative user. In some such embodiments, each such candidate indicator may include a dedicated aspect, such as a GUI sub-tool (e.g., a row of the GUI), depicting an overview of key metrics for each such candidate. In subsequent step 319, in some embodiments, such a dedicated aspect may include a hyperlink, or other selectable aspect which, when selected, leads to the generation and presentation of an additional GUI, presenting additional informational details of the open employment position (a "Candidate Detail GUI"), in step 321. For example, in some embodiments, an ApplicantIQ score, or other key performance or suitability indicators for a candidate, as discussed in detail elsewhere in this application, may be provided for each such candidate in such a Candidate Detail GUI. And, in subsequent step 323, in some embodiments, the control system may next determine whether some candidates' indicators match or exceed predetermined thresholds for selection of that candidate (e.g., for an employment offer or additional, in-person interviewing), and, if so, in subsequent step 325, the control system may set appointments for such interviews, or even generate binding offers of employment, in some embodiments. If, however, none of the candidates' indicators so match or exceed pre-determined thresholds, in some embodiments, the control system proceeds to indicate that fact to the administrative user and, in some such embodiments, to present additional GUI tools and sub-tools allowing the administrative user to make changes to employment position listings, in step 327.

In any event, after step 325 or 327, as the case may be, the control system may then return to the starting position, in some embodiments.

Figure 4:
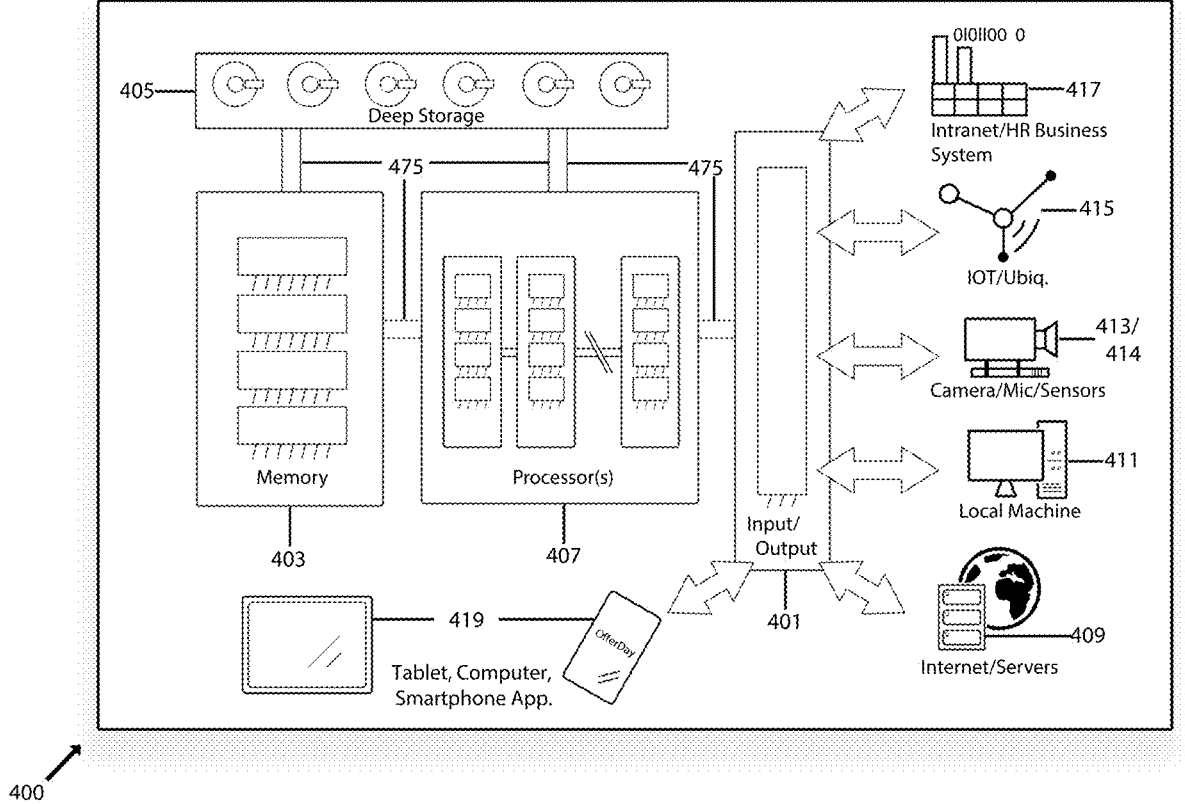
FIG. 4 is a schematic block diagram of some elements of a control system in accordance with some example embodiments.

FIG. 4 is a schematic block diagram of some elements of a control system 400 in accordance with an example embodiment of the present invention. In some example embodiments, control system 400 incorporates a non-transitory machine-readable medium storing instructions, that, when executed by one or more processors, execute various aspects of the present invention described herein. The generic and other components and aspects described herein are not exhaustive of the many different systems and variations, including a number of possible hardware aspects that might be used, in accordance with the example embodiments of the invention. Rather, the control system 400 is an exemplary embodiment.

Control system 400 includes an input/output device 401, a memory device 403, long-term data storage device 405, and processor(s) 407. The processor(s) 407 is (are) capable of receiving, interpreting, processing and manipulating signals and executing instructions for further processing and for output, pre-output and/or storage in and outside of the system. The processor(s) 407 may be general or multipurpose, single- or multi-threaded, and may have a single core or several processor cores, including microprocessors. Among other things, the processor is capable of processing signals and instructions for the input/output device 401, to cause a user interface to be provided or modified for use by a user on hardware, such as, but not limited to, physical hand-operated controls (e.g., on a handheld or other portable device, such as tablet or smartphone 419 running specialized computer software to manage diverse forms and instances of communications related to projects) and/or a personal computer monitor or terminal monitor with a mouse and keyboard and presentation and input-facilitating software (as in a graphical user interface, a.k.a. a "GUI") (e.g., on local machine(s) 411).

For example, user interface aspects, such as graphical "windows," "buttons" and data entry fields, may present via, for example, a display, a selectable option. When the option is selected, such selection causes aspects of the control system to command other aspects of the control system to manage any of several aspects of a recruitment process, as discussed in this application, including the full review of candidate resumes, generating an Resume Score, conducting interviews via an AI agent implemented by the Offerday system, generating an Interview Score based on such interviews, generating an ApplicantIQ score, and filtering and recommending and selecting candidates, and making offers of employment to selected candidates. As another example, and also as explained elsewhere in this application, the control system may include a neural network, trained on data, documents, and recorded employment performance outcomes of past employees, and create unique algorithms for ranking and rating candidates based on their own data and documents (e.g., a transcript, resume, writing sample, and interview colloquy), and perform actions based thereon.

The processor(s) 407 may execute instructions stored in memory device 403 and/or long-term data storage device

405, and may communicate via system bus(ses) 475. Input/output device 401 is capable of input/output operations for the system, and may include and communicate through input and/or output hardware, and instances thereof, such as a computer mouse, scanning device or other sensors, actuator(s), communications antenna(ae), keyboard(s), smartphone(s) and/or PDA(s), networked or connected additional computer(s), camera(s) or microphone(s), a mixing board(s), real-to-real tape recorder(s), external hard disk recorder(s), additional movie and/or sound editing system(s) or gear, speaker(s), external filter(s), amp(s), preamp(s), equalizer(s), computer display screen(s) or touch screen(s). Such input/output hardware could implement a program or user interface created, in part, by software, permitting the system and user to carry out the user settings and input discussed in this application. Input/output device 401, memory device 403, data storage device 405, and processor(s) 407 are connected and able to send and receive communications, transmissions and instructions via system bus(ses) 475. Data storage device 405 is capable of providing mass storage for the system, and may be or incorporate a computer-readable medium, may be a connected mass storage device (e.g., flash drive or other drive connected to a Universal Serial Bus (USB) port or Wi-Fi), may use back-end (with or without middle-ware) or cloud storage over a network (e.g., the Internet) as either a memory backup for an internal mass storage device or as a primary memory storage means, or may simply be an internal mass storage device, such as a computer hard drive or optical drive. Generally speaking, the system may be implemented as a client/server arrangement, where features of the system are performed on a remote server, networked to the client and made a client and server by software on both the client computer and server computer. Also generally speaking, the system may be implemented as middleware, whereby it provides output and other services to an external system, including, but not limited to, any of the example devices and auxiliary devices and/or systems, shown as internet server(s) and blockchain(s) 409, local machine(s) 411, cameras and microphones 413, sensor(s) 414, internet of things or other ubiquitous computing devices 415, Intranet and/or FM business system 417, and tablet or smartphone 419. Similarly, the control system 400 is capable of accepting input from any of those auxiliary devices and systems, and modifying stored data within them and within itself, based on any input or output sent through input/output device 401.

Input and output devices may deliver their input and receive output by any known means, including, but not limited to, any of the hardware and/or software examples shown as internet server(s) and blockchain(s) 409, local machine(s) 411, cameras and microphones 413, sensor(s) 414, internet of things or other ubiquitous computing devices 415, Intranet and/or FM business system 417, and tablet or smartphone 419.

While the illustrated example of a control system 400 in accordance with the present invention may be helpful to understand the implementation of aspects of the invention, any suitable form of computer system known in the art may be used—for example, a simpler computer system containing just a processor for executing instructions from a memory or transmission source. The aspects or features set forth may be implemented with, and in any combination of, digital electronic circuitry, hardware, software, firmware, middleware or any other computing technology known in the art, any of which may be aided with external data from external hardware and software, optionally, by networked connection, such as by LAN, WAN or the many connections forming the Internet. The system can be embodied in a tangibly-stored computer program, as by a machine-readable medium and propagated signal, for execution by a programmable processor. The many possible method steps of the example embodiments presented herein may be performed by such a programmable processor, executing a program of instructions, operating on input and output, and generating output and stored data. A computer program includes instructions for a computer to carry out a particular activity to bring about a particular result, and may be written in any programming language, including compiled and uncompiled and interpreted languages and machine language, and can be deployed in any form, including a complete program, module, component, subroutine, or other suitable routine for a computer program.

Figure 5:
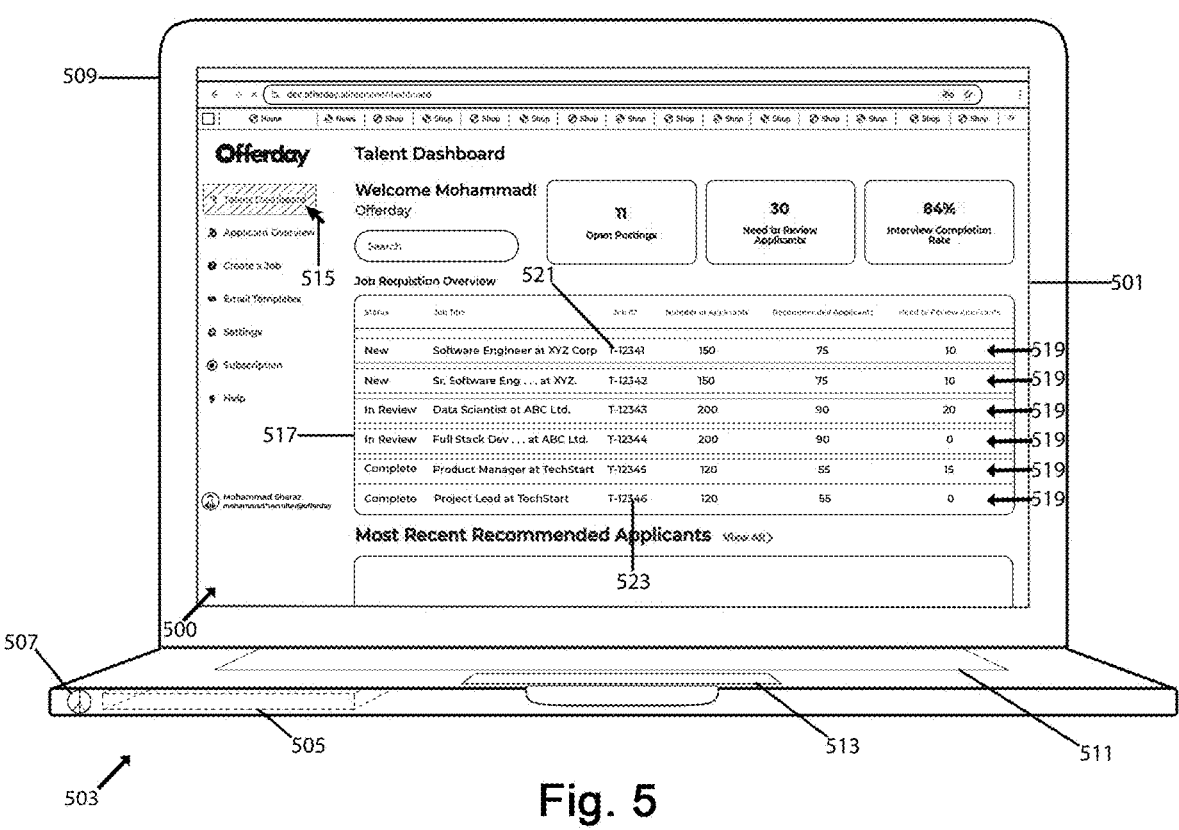
FIG. 5 depicts an example graphical user interface ("GUI") which may be included in an Offerday system to carry out aspects of the present inventions, in accordance with some embodiments.

FIG. 5 depicts an example graphical user interface ("GUI") 500, presented on a display 501 of a local computer device 503, which may be included in an Offerday system to carry out aspects of the present inventions, in accordance with some embodiments. In various embodiments, local computer device 503 may be comprised in, or may comprise, a control system 505, which may be a control system such as that set forth below in reference to FIG. 4, below. In some such embodiments, control system 505 may or may not be configured for communications with a communications network and/or other, similar control systems (e.g., through wireless antenna 507), as will be discussed in greater detail below. In any event, whether comprising or comprised within such a control system, local computer device 503 may be capable of executing any of the techniques for managing communications, maintenance and other related processes as an Offerday system.

As mentioned above, in some embodiments, local computer device 503 may comprise user interface tools, such as display 501, which may be in the form of a computer monitor 509, for presenting a GUI (such as GUI 500), and input devices (such as exemplary keyboard 511 and mouse 513, for manipulating an arrow pointer or cursor, such as exemplary GUI input arrow 515). In various alternative embodiments, any number of alternative GUI elements and hardware devices may be used, instead or in addition to those pictured, to carry out the display, input and other operations necessary or helpful for carrying out aspects of the invention set forth in this application. The exact detailed embodiments provided, including the devices and GUI elements set forth in the figures and discussed in detail in this application are only exemplary, and not limiting. These and other embodiments set forth in this application are intended only as a reasonable set of possible exemplary structures, substructures, materials, methods, steps and other aspects of the present inventions, among virtually infinite and innumerable possibilities for carrying out the present inventions, to ease comprehension of the disclosure, as will be readily apparent to those of ordinary skill in the art. For example, the description of one particular order, number or other arrangement of any aspects of the present inventions set forth herein are illustrative, not limiting, and all other possible orders, numbers, etc., are also within the scope of the inventions, as will be so readily apparent. Any aspect of the invention set forth herein may be included with any other aspect in a particular embodiment, as well as any aspects known in the art, in any number, order, arrangement, or alternative configuration while still carrying out, and falling within, the scope of the invention.

In accordance with methods set forth in greater detail below, users may communicate with the control system 505, and other users through the Offerday system, in a variety of communication channels and formats, and/or share, download or upload employment-related documents and other files. Among other embodiments, such communications and files may be communicated through local computer device 503 by e-mail, file transfer protocol (FTP), text/SMS messaging, voice messaging, or communications platforms, or via disk or other media transfer of data.

In some embodiments, example GUI 500 is an administrative user GUI, and, as such, includes GUI tools and sub-tools for use by an administrative user, such as any of the GUI tools and sub-tools discussed further below. As discussed elsewhere in this application, such an administrative user may be an employer user, or a user serving as an agent for such an employer user (e.g., a recruiter user) in some embodiments.

Among other things, in some embodiments, such GUI sub-tools may include a list of indicators of open employment position listings 517 being managed by the control system and that particular administrative user. In some such embodiments, such a list of indicators of open employment position listings 517 includes a dedicated aspect, such as a GUI sub-tool (a row of the GUI, such as each of example selectable rows 519), which each may depict an overview of key metrics for each such open employment position. And, in some embodiments, such a dedicated aspect may include a unique identifier of each such open employment position (which also may be referred to as a "Job ID," in this application, such as example Job ID 521). In some embodiments, such a dedicated aspect and/or Job ID may include a hyperlink 523, or other selectable aspect which, when selected, lead to the generation and presentation of an additional GUI, presenting additional details of the respective listing of the open employment position (a "Job Detail GUI"), as discussed further below.

Figure 6:
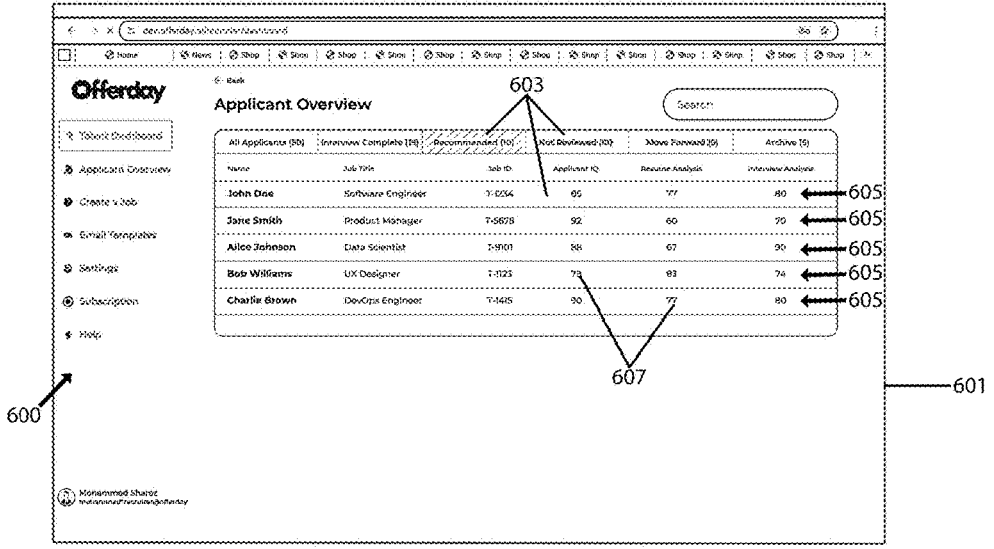
FIG. 6 depicts another example graphical user interface ("GUI") which may be included in an Offerday system to carry out aspects of the present inventions, in accordance with some embodiments.

FIG. 6 depicts another example graphical user interface ("GUI") 600 presented on a display 601 of a local computer device, such as example local computer device 503, discussed above (other aspects of which omitted in the present figure, for simplicity) known as a Job Detail GUI, which may be included in an Offerday system to carry out aspects of the present inventions, in accordance with some embodiments. As discussed above, in some embodiments, a Job Detail GUI may be generated and presented for any employment position listing made for an administrative user of the control system, and the control system may next accept input from the administrative user, using selectable job detail indicators, such as the example job indicators 603, among other particular GUI aspects of the Job Detail GUI shown. For example, in some embodiments, the administrative user may select candidates for in-person interviewing, by selecting any of selectable rows 605, based on GUI sub-tool indicators, such as the example sub-tool indicators 607, within the Job Detail GUI indicating candidates which exceed particular analytical fitness indicators quantities or thresholds with respect to the listing, as discussed elsewhere in this application.

As another example, and as pictured, in some embodiments, the Job Detail GUI may present aspects allowing the administrative user to add or alter suitability criteria for the open employment position subject to the listing, and for such thresholds. And, if the administrative user has so adjusted such criteria and thresholds, in some embodiments, the control system may next record the new criteria and such thresholds and/or other settings relevant to the listed open employment position, and may run LLM's based on those alterations. If the administrative user has not altered any such criteria or other settings, however, the control system may return to the starting position (e.g., after a threshold amount of time has expired, or after the administrative user selects to exit the Job Detail GUI, in some embodiments). The control system may then proceed to re-run other LLMs based on the selected criteria, as discussed elsewhere in this application.

Figure 7:
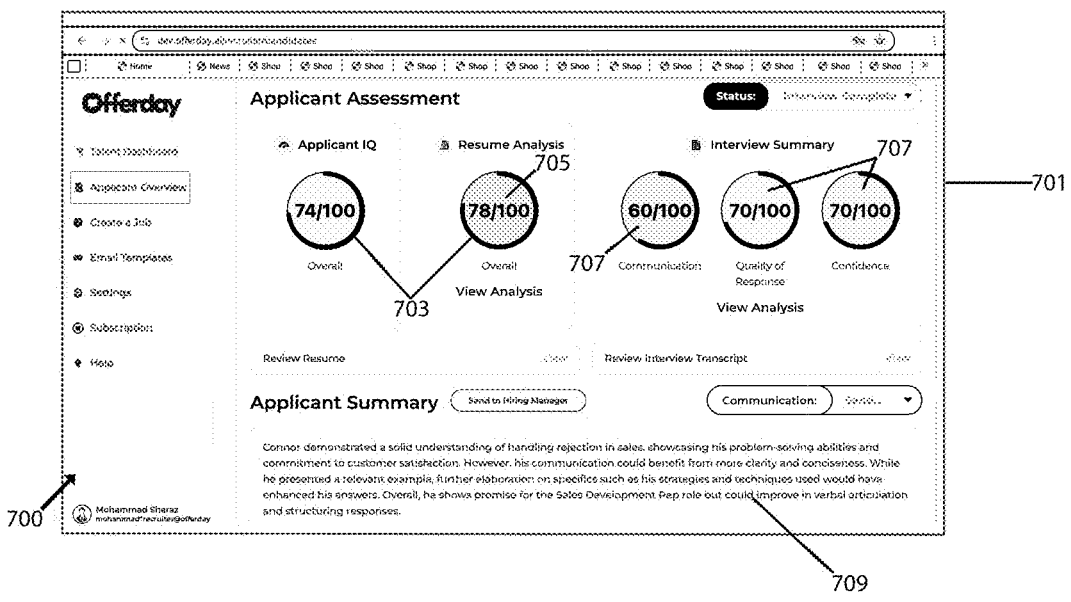
FIG. 7 depicts another example graphical user interface ("GUI") which may be included in an Offerday system to carry out aspects of the present inventions, in accordance with some embodiments.

FIG. 7 depicts another example graphical user interface ("GUI") 700 presented on a display 701 of a local computer device, such as example local computer device 503, discussed above (other aspects of which omitted in the present figure, for simplicity) known as an "Applicant Detail GUI," which may be included in an Offerday system to carry out aspects of the present inventions, in accordance with some embodiments. In some embodiments, GUI 700, and other such Applicant Detail GUIs in accordance with the present application, may include a plurality of indicators, such as the examples shown as candidate fitness indicators 703, each of which is related to a candidate's fitness for a particular employment listing to which she or he has applied.

In some embodiments, an Applicant Detail GUI, such as GUI 700, may be created and/or presented by an Offerday system, and/or a control system included within an Offerday system, when an administrative user selects a tool or sub-tool of an Applicant overview GUI relating to a particular candidate who has applied in response to an employment position listing.

And, as discussed above, in some embodiments, aspects of an Offerday system, and/or a control system included within an Offerday system, may generate a plurality of candidate fitness indicators, which may relate to that candidate's characteristics, including soft criteria, as they compare with characteristics that are suitable for the employment position listing, in some embodiments. And, in some embodiments, as also discussed in greater detail above, a series of complex, staged and interrelated scores, in some embodiments, may be generated by the Offerday system and/or control system, to aid an administrative user in understanding a particular candidate's fitness for a particular employment position listing. For example, an indicator of a candidate's Resume Score, known as a resume score indicator 705, may be provided, and may express (e.g., on a scale of 1-100) the degree to which that candidate's relevant characteristics stated in her or his resume (and/or, in some embodiments, other documents or materials submitted in response to the employment position listed) match the type and prominence of characteristics sought by the employment position listing.

As another example, in some embodiments, a candidate's Interview Score, known as an interview score indicator, may be provided, and may express (e.g., on a scale of 1-100) the degree to which that candidate's relevant characteristics as determined at an interview match the type and prominence of characteristics sought by the employment position listing. In some embodiments, more than one interview score, each relating to a particular characteristic, such as interview characteristic score indicators 707, may be included, and may be used in place of a single interview score.

And, as discussed elsewhere in this application, in some embodiments, an ApplicantIQ score is provided, and may express (e.g., on a scale of 1-100) the degree to which that candidate's is an appropriate candidate for the listed position, based on a dynamic weighting (e.g., through an algorithm developed and maintained by an AI sub-module, such as an LLM) of the various interrelated scores, based on training with past interrelated scores associated with candidates who have performed successfully in similar positions in the past, through any of the methods discussed elsewhere, above, in this application. And, in some embodiments, a textual description feature 709 may be also be generated, relaying statements regarding individual qualities of a candidate relevant to their candidacy, which also may be generated by such an LLM, in some such embodiments.

It should be understood that the above-described components, steps, and number and order of components and steps discussed in this application, are only exemplary of certain embodiments set forth in this application, which are not intended to limit the application in any way. In fact, virtually unlimited alternative orders, numbers and instances of the above steps and components, in addition with countless additional and alternative steps, may be used and/or performed, within the scope of the present application and inventions herein, as will be readily apparent to those of skill in the art. For instance, although the example of three candidate related scores has been provided, it should be understood that more, or fewer scores may be implemented, in various embodiments, while carrying out aspects of the present inventions, as will be readily apparent to those of skill in the art.

FIG. 8 depicts another example graphical user interface ("GUI") 800 presented on a display 801 of a local computer device, such as example local computer device 503, discussed above (other aspects of which omitted in the present figure, for simplicity) known as an "Resume Analysis GUI," which may be included in an Offerday system to carry out aspects of the present inventions, in accordance with some embodiments. In some embodiments, GUI 800, and other GUIs in accordance with the present application, may include a plurality of indicators, such as the examples shown as candidate fitness indicators 803, each of which is related to a candidate's fitness for a particular employment listing to which she or he has applied.

In some embodiments, a Resume Analysis GUI, such as GUI 800, may be created and/or presented by an Offerday system, and/or a control system included within an Offerday system, when an administrative user selects a tool or sub-tool of an "Applicant Detail" or "Applicant Detail GUI," such as Applicant Detail GUI 700, discussed above, relating to a resume and/or resume-related documentation uploaded by or for a particular candidate who has applied in response to an employment position listing.

And, as discussed above, in some embodiments, aspects of an Offerday system, and/or a control system included within an Offerday system, may generate a plurality of candidate fitness indicators, each of which may relate to that candidate's characteristics, including soft criteria, as they compare with characteristics that are suitable for the employment, such as candidate fitness indicators 803. Further, in the instance of Resume Analysis GUI 800, as pictured, some such candidate fitness indicators may relate to the candidate's fitness for such an employment position as determined by AI components and/or subcomponents of a control system of the Offerday system, such as example resume analysis sub-module 215, discussed above. For example, in various embodiments, such an AI module or sub-module (which, in some embodiments, may include one or more LLMs, such as example resume analysis LLM 219, discussed above) may aid in the review of candidates' resumes by comparing qualifications stated or reflected therein with criteria stated in, or derived from, the employment position listing. In some embodiments, a resume analysis LLM: A. analyzes listing information for the given employment position; and B. aids in determining the Resume Score for a given applicant's submission of written application materials, including, but not limited to, the candidate's resume. In some embodiments, the resume analysis LLM is trained on data related to a plurality of historic resumes and other written application materials, e.g., submitted in response to other employment positions, related to the given employment position, which have been labelled as having, or not having, particular job performance criteria. And, in some embodiments, to analyze listing information for the given employment position, the resume analysis LLM is trained on data related to a plurality of historic employment position listings, which were previously labelled as relating to the same, or a similar employment position, and, based on that training, includes a neural network that produces a model language for each such criteria. However, in some embodiments, a separate, listing analysis LLM may be included, in addition to the resume analysis LLM, to so determine the identity and weighting of such job performance criteria.

In some embodiments, a resume analysis AI subcomponent may generate output related to its comparison of a candidate's resume, and aspects thereof, with a model resume created by a neural network based on training data (e.g., historical resumes labelled as good matches for a position similar to the listed position for which the candidate supplied her or his resume). And, in some such embodiments, such output may include a Resume Score, which Resume Score may be, or include, a numeric indicator of the relative appropriateness of a candidate, as indicated by the candidate's resume, in comparison to other candidates resumes, as determined with respect to a given employment position for which an employment candidate is applying. An example of such a Resume Score is shown in the present figure as Resume Score 805, for example, which demonstrates the level of appropriateness of the candidate subject to GUI 800 as a percentage figure (in this instance, indicating the candidate's overall characteristics are a 78% match for the listed employment position).

In some embodiments, as discussed above, such a Resume Score may be determined by an algorithm, based on a plurality of variables and/or sub-factors, which may include quantified expressions of the relative degree to which a candidate possesses characteristics, in comparison to other candidates, which are relevant to such a Resume Score. And, in some embodiments, such an algorithm may be continuously or periodically updated by an AI resume analysis subcomponent and/or resume analysis LLM, to generate such a Resume Score, based on a weighting of each of such characteristics by such an algorithm, which may itself be periodically or continuously updated, based on new training data, including resumes labelled as related to successful and unsuccessful candidates for similar employment positions to the listed employment position.

In addition to an analysis of formal employee qualifications related to the subject matter of a listed position, in some embodiments, the resume analysis sub-module 215 and/or resume analysis LLM 219 determine(s) other "soft" criteria for employment qualifications, or types thereof, such as: i. cultural fit, ii. behavior, iii. temperament, iv. other personality traits, v. proclivities, vi. habits and routines, vii. outside activities and viii. outside interests of the candidate. In some such embodiments, the AI-based resume analysis sub-module of the Offerday System analyzes both: 1) the listing information for the given employment position, and 2) the resume and/or other written application materials submitted by the candidate for the given position, for the presence of such soft criteria, and whether the listing information and the written application materials and the listing are complementary, meaning the degree to which the listing information and the written application materials emphasize the same soft criteria, and to a similar degree.

In some embodiments, in addition to indicating a Resume Score, such as example Resume Score 805, GUI 800 also displays candidate fitness indicators reflecting one or more (and in some embodiments, each) of the plurality of variables and/or sub-factors that the Resume Score is based on.

For example, in the present figure, such a variable and/or subfactor is a work experience variable and/or subfactor, corresponding with the amount of relevant work history experience that the candidate appears to have, based on the resume they have submitted, and is a quantification of (e.g., expressed as a percentage) of the degree to which that work history experience matches the type and amount of experience determined to be required based on the employment position listing. In some embodiments, such a work experience variable and/or subfactor is expressed in a work history indicator 807, which may include a numerical and graphical representation of that quantification for the employment candidate subject to the Resume Analysis GUI 800.

As another example, another such a variable and/or subfactor is a required skills variable and/or subfactor, corresponding with the amount of minimum, prerequisite job skills for the listed employment position that the candidate appears to possess, based on the resume they have submitted, and is a quantification of (e.g., expressed as a percentage) of the degree to which those job skills match the type and amount of work skills determined to be required, at a minimum, based on the employment position listing. In some embodiments, such a required skills variable and/or subfactor is expressed in a required skills indicator 809, which may include a numerical and graphical representation of that quantification for the employment candidate subject to the Resume Analysis GUI 800.

And, as another example, another such a variable and/or subfactor is a preferred skills variable and/or subfactor, corresponding with the amount of job skills that are sought (albeit not a prerequisite) for the listed employment position that the candidate appears to possess, based on the resume they have submitted, and is a quantification of (e.g., expressed as a percentage) of the degree to which those job skills match the type and amount of work skills determined to be sought, based on the employment position listing. In some embodiments, such a required skills variable and/or subfactor is expressed in a preferred skills indicator 811, which may include a numerical and graphical representation of that quantification for the employment candidate subject to the Resume Analysis GUI 800.

As another example, another such a variable and/or subfactor is an education variable and/or subfactor, corresponding with the amount of education relevant to the listed employment position that the candidate appears to possess, based on the resume they have submitted, and is a quantification of (e.g., expressed as a percentage) of the degree to which that education matches the type and amount of education determined to be sought, based on the employment position listing. In some embodiments, such an education variable and/or subfactor is expressed in an education indicator 813, which may include a numerical and graphical representation of that quantification for the employment candidate subject to the Resume Analysis GUI 800.

As another example, another such a variable and/or subfactor is a key words, terms and/or phrases variable and/or subfactor, corresponding with the number and amount of key words present in the candidate's submitted resume submitted that match key words determined to be relevant to the listed employment position, and is a quantification of (e.g., expressed as a percentage) of the degree to which those key words match the type, amount and priority ranking of key words, terms and/or phrases determined to be relevant employment position listing. In some embodiments, such a key word variable and/or subfactor is expressed in a key word indicator 815, which may include a numerical and graphical representation of that quantification for the employment candidate subject to the Resume Analysis GUI 800.

As another example, and as discussed above, another such a variable and/or subfactor is a soft criteria variable and/or subfactor, corresponding with a degree to which the candidate appears to possess one or more soft criteria, based on the resume they have submitted, and is a quantification of (e.g., expressed as a percentage) of the degree to which those possessed soft criteria match the type and amount of soft criteria determined to be sought, based on the employment position listing. In some embodiments, such a soft criteria variable and/or subfactor is expressed in a soft criteria indicator 817, which may include a numerical and graphical representation of that quantification for the employment candidate subject to the Resume Analysis GUI 800.

As another example, another such a variable and/or subfactor is an ATS parser rate variable and/or subfactor, corresponding with the degree to which the candidate's resume is parable by third-party applicant tracking systems (ATS's), based on an analysis of the resume they have submitted, and is a quantification of (e.g., expressed as a percentage) of that degree. In some embodiments, such an ATS parser rate variable and/or subfactor is expressed in an ATS parser rate indicator 819, which may include a numerical and graphical representation of that quantification for the employment candidate subject to the Resume Analysis GUI 800.

As another example, another such a variable and/or subfactor is a quantifying impact variable and/or subfactor, corresponding with the amount of quantifiable success an employee has demonstrated in past employment roles, based on the resume and related documents they have submitted, and is a quantification of (e.g., expressed as a percentage) of quantifiable success (e.g., achieving or exceeding monetary or other business goals goals) relevant to the employment position listing. In some embodiments, such a quantifying impact variable and/or subfactor is expressed in quantifying impact indicator 821, which may include a numerical and graphical representation of that quantification for the employment candidate subject to the Resume Analysis GUI 800.

In some embodiments, a textual candidate description feature 823 may be also be generated by the Offerday system, relaying statements regarding individual qualities of a candidate based on their submitted resume (and, in some embodiments, related documentation) relevant to their candidacy, which may be generated by an LLM, in some such embodiments.

In some such embodiments, the relative weighting of each such characteristics and quantifications to produce Resume Scores, as discussed above, in such an algorithm may be periodically updated by an AI subcomponent of the Offerday system, based on training data including past candidate resumes for similar employment positions which relate to candidates who more successfully fulfilled their roles in those similar employment positions, in some embodiments.

In some embodiments, the control system may aid by selecting employment candidates, comparing their Resume Score to other candidates' Resume Scores.

What is claimed is:

1. A hiring management system, comprising:
   a control system, comprising:
     specialized computer software;
     a resume processing module comprising a first large language model, capable of analyzing a new employment candidate's resume, including a resume analysis sub-module, and comprising a resume scoring algorithm, which first large language model is trained on A) historically submitted resumes and B) other written application materials, each having been labelled as being associated with, or not being associated with, historic candidates' possession of criteria relevant to a historic employment position;
     a listing analysis module, capable of determining relevant variables identified within listing information for an employment position submitted by an employer user;
     wherein the listing analysis module comprises an artificial intelligence subsystem, trained on data submitted by said employer user and/or other employer users related to a plurality of employment positions historically submitted by the employer user and/or the other employer users of the system, and wherein the artificial intelligence subsystem generates a list of terms present in the data submitted by said employer user and/or other employer users which have been linked statistically and incidentally by the artificial intelligence subsystem to a type of soft criteria, but which do not directly indicate the type of soft criteria;
     an interview generation and analysis module, comprising a second large language model, and comprising an interview scoring algorithm, capable of generating a series of unique interview questions based on i) qualifications of the new employment candidate; ii) said relevant variables, and/or iii) soft criteria identified within said listing information for said employment position submitted by said employer user;
     an administrative user graphical user interface (GUI) wherein an administrative user may preset a first threshold level for either or both a Resume Score for employment candidates, which Resume Score is created by said resume scoring algorithm, and a second threshold for an Interview Score for employment candidates, which Interview Score is created by said interview scoring algorithm, and the hiring management system generates a first live interview session and/or employment instructions based on whether the new employment candidate exceeds the first threshold and/or the second threshold; and
     an application programming interface (API) configured to exchange data with an applicant tracking system (ATS) via said communications hardware.

2. The hiring management system of claim 1, wherein at least some of the historically submitted resumes and other written application materials have been labelled as being associated with said historic candidates' possession of job criteria for said historic employment position.

3. The hiring management system of claim 1, comprising a third large language model, comprised in said listing analysis module, trained on data related to a plurality of historic employment positions submitted by the employer user and/or other employer users of the system.

4. The hiring management system of claim 1, wherein said data related to a plurality of historic employment positions submitted by the employer user and/or other employer users of the system relate to employment positions submitted by the employer user.

5. The hiring management system of claim 1, wherein said data related to a plurality of historic employment positions submitted by the employer user and/or other employer users of the system relate to successfully filled employment positions.

6. The hiring management system of claim 1, wherein said data related to a plurality of historic employment positions submitted by the employer user and/or other employer users of the system relate to successfully filled employment position by said employer user.

7. The hiring management system of claim 1, wherein the system generates a Resume Score for said new employment candidate's resume.

8. The hiring management system of claim 7, wherein the system generates an Interview Score of said first live interview.

9. The hiring management system of claim 8, wherein the system generates an ApplicantIQ Score, based on said Resume Score for said new employment candidate's resume and said Interview Score of said first live interview.

10. The hiring management system of claim 8, wherein the Interview Score is based on the presence of soft criteria actively pursued and identified within responses to said first live interview.

11. The hiring management system of claim 10, wherein said presence of said type of soft criteria is determined based on the presence or absence of key words, phrases and/or other terms related to and/or statistically, incidentally or otherwise associated with, how said new employment candidate expresses themselves as semantic or sentiment indicators, which do not directly indicate that the new employment candidate possesses said type of soft criteria.

12. The hiring management system of claim 7, wherein the system generates qualitative data concerning the new employment candidate's fitness for said employment position submitted by an employer user subject to said listing information, in addition to a quantitative Resume Score.

13. The hiring management system of claim 12, wherein said qualitative data comprises data regarding the presence of soft criteria, and wherein the quantitative Resume Score is based on the presence of a type soft criteria identified within said new employment candidate's resume.

14. The hiring management system of claim 13, wherein said presence of said soft criteria is determined based on the presence or absence of key words, phrases and/or other terms related to and/or are statistically, incidentally or otherwise associated with, how said new employment candidate expresses themselves as semantic or sentiment indicators, which do not directly indicate that the new employment candidate possesses said soft criteria.

15. The hiring management system of claim 1, wherein the interview generation and analysis submodule dynamically generates an interview including interview questions actively pursuing responses relevant to said relevant variables within listing information identified by the listing analysis module.

16. A method for hiring, comprising the following step: implementing a hiring management system, comprising:
a control system, comprising:
specialized computer software;
a resume processing module comprising a first large language model, capable of analyzing a new employment candidate's resume, including a resume analysis sub-module, and comprising a resume scoring algorithm, which first large language model is trained on A) historically submitted resumes and B) other written application materials, each having been labelled as being associated with, or not being associated with, historic candidates' possession of criteria relevant to a historic employment position;
a listing analysis module, capable of determining relevant variables identified within listing information for an employment position submitted by an employer user;
wherein the listing analysis module comprises an artificial intelligence subsystem, trained on data submitted by said employer user and/or other employer users related to a plurality of employment positions historically submitted by the employer user and/or the other employer users of the system, and wherein the artificial intelligence subsystem generates a list of terms present in the data submitted by said employer user and/or other employer users which have been linked statistically and incidentally by the artificial intelligence subsystem to a criteria relevant to a historic job which is a type of soft criteria, but which does not directly indicate the type of soft criteria;
an interview generation and analysis module, comprising a second large language model, and comprising an interview scoring algorithm, capable of generating a series of unique interview questions based on i) qualifications of the new employment candidate; ii) said relevant variables and/or soft criteria identified within said listing information for said employment position submitted by said employer user;
an administrative user graphical user interface (GUI) wherein an administrative user may preset a first threshold level for either or both a Resume Score for employment candidates, which Resume Score is created by said resume scoring algorithm, and a second threshold for an Interview Score for employment candidates, which Interview Score is created by said interview scoring algorithm, and the hiring management system generates a first live interview session and/or employment actions based on whether the new employment candidate exceeds the first threshold and/or the second threshold; and
an application programming interface (API) configured to exchange data with an applicant tracking system (ATS) via said communications hardware.

17. The method for hiring of claim 16, comprising the following additional steps:
generating said first live interview session within an employee user GUI to said new employment candidate;
generating an Interview Score of said first live interview, based, at least in part, on the generated list of terms which have been linked statistically and incidentally by the artificial intelligence subsystem to a type of soft criteria, but which does not directly indicate the type of soft criteria, and the interview scoring algorithm.

18. The method for hiring of claim 17, comprising the following additional step:
generating a Resume Score of said new employment candidate's resume.

19. The method for hiring of claim 18, comprising the following additional step:
generating an ApplicantIQ Score, based at least in part on:
A) said Interview Score of said first live interview, B) said Resume Score of said new employment candidate's resume, and C) the correlation of responses in said first live interview with said list of terms which have been linked statistically and incidentally by the artificial intelligence subsystem to a type of soft criteria, but which does not directly indicate the type of soft criteria.

20. The method for hiring of claim 19, comprising the following additional step:

applying said first threshold level and/or said second threshold level;

wherein the hiring management system issues employment are created over said API and executed on said ATS.

\* \* \* \* \*